United States Patent
Tien et al.

(10) Patent No.: US 8,286,258 B2
(45) Date of Patent: Oct. 9, 2012

(54) MONITOR METHOD AND MONITOR APPARATUS FOR MONITORING DATA OF HARDWARE

(75) Inventors: Chin-Wei Tien, Shulin (TW); Yao-Ting Chung, Banqiao (TW); Chih-Hung Lin, Zhonghe (TW); Jain-Shing Wu, Taipei (TW)

(73) Assignee: Institute for Information Industry, Taipei (TW)

( * ) Notice: Subject to any disclaimer, the term of this patent is extended or adjusted under 35 U.S.C. 154(b) by 261 days.

(21) Appl. No.: 12/631,546

(22) Filed: Dec. 4, 2009

(65) Prior Publication Data

US 2011/0138485 A1   Jun. 9, 2011

(51) Int. Cl.
*H04L 29/06* (2006.01)

(52) U.S. Cl. ............... 726/30; 726/2; 726/5; 726/29; 715/745

(58) Field of Classification Search ........... 726/30; 715/745

See application file for complete search history.

(56) References Cited

U.S. PATENT DOCUMENTS

| | | | |
|---|---|---|---|
| 5,774,670 A | | 6/1998 | Montulli |
| 7,137,009 B1* | | 11/2006 | Gordon et al. ............... 713/185 |
| 2003/0144988 A1* | | 7/2003 | Nareddy et al. .............. 707/1 |
| 2007/0089088 A1* | | 4/2007 | Borde et al. ................... 717/106 |
| 2008/0027824 A1* | | 1/2008 | Callaghan et al. .......... 705/26 |
| 2008/0052775 A1* | | 2/2008 | Sandhu et al. ................ 726/14 |

OTHER PUBLICATIONS

Park et al., "Secure Cookies on the Web", Jul. 2000, pp. 36-44.*
Ari Juels et al, "Active Cookies for Browser Authentication", RavenWhite Inc., Apr. 28, 2006, 18 pages.
D. Kristol et al., "HTTP State Management Mechanism", The Internet Society, Oct. 2000, 26 pages.
Combined Search and Examination Report under Sections 17 and 18(3) for application GB0921211.9 (foreign counterpart to U.S. Appl. No. 12/631,546), UK Intellectual Property Office, Mar. 23, 2010, 11 pages.

* cited by examiner

*Primary Examiner* — Taghi Arani
*Assistant Examiner* — Thaddeus Plecha
(74) *Attorney, Agent, or Firm* — Skaar Ulbrich Macari, P.A.

(57) ABSTRACT

A monitor method and a monitor apparatus for monitoring a data of hardware are provided. The data has private information, identification information and at least one first network transmission address. The monitor apparatus comprises a storage unit and a processing unit. The data is stored in the storage unit according to the identification information. The processing unit is configured to record the identification information and the at least one first network transmission address of the data in a mark information table. In response to a sending system call, when a transmission is arranged to transmit the private information of the data to a second network transmission address which is different from the at least one first network transmission address, the processing unit will output a signal to cease the transmission.

16 Claims, 3 Drawing Sheets

MONITOR METHOD AND MONITOR APPARATUS FOR MONITORING DATA OF HARDWARE

FIELD

The present invention relates to a monitor method and a monitor apparatus for monitoring data of hardware. More specifically, the present invention relates to a monitor method and a monitor apparatus capable of avoiding improper transmission of data having private information.

BACKGROUND

With development of the IT industry, computers and networks have become indispensable in daily life. For example, people have been accustomed to processing various data, searching different kinds of information, shopping and exchanging data via network by computers. Furthermore, network services such as setting an account with an E-credit card, ordering via the Internet and withdrawing money from a web ATM are also frequently used.

When using the aforesaid network services, the users usually have to transmit data having private information of the users to the network service providers via the network, wherein the private information may comprise account/password information, an ID card No., online transaction records or the like. Typically, the data having the private information of the users is transmitted through a browser interface. Hence, many hackers use existing bugs of the browser interface to steal the data transmitted to the network service providers, thereby causing breaching events of private information.

For example, after a user inputs an account/password in a webpage of a network service provider (e.g., Yahoo) and logs in a membership page, the data associated with the Yahoo account/password inputted by the user will be stored in the user's computer with a storage path and a data name. Later, when the user wants to log in the Yahoo webpage again, the computer can access the data associated with the Yahoo account/password via the storage path and the data name, so the user can log in the membership page directly. In this process, hackers may use browser bugs to execute a malware through an encoded scripting language and transmit the data having the Yahoo account/password via the browser to a network address assigned in advance by the hacker.

To solve this problem, prior art provides software for detecting the malware, wherein the software analyzes different malwares and establishes a database of different malwares signatures. Accordingly, the malwares can be detected according to the malware signatures, the software further avoids running the malwares and transmitting the data having private information of the user to the network address assigned in advance by the hacker.

However, because of properties of the scripting language, it is not only difficult for the conventional malware detecting software to detect malwares executed by scripting languages, but also impossible to establish a database having general signatures for all malwares. In other words, the conventional malware detecting software would fail to detect and analyze a malware if the scripting language of the malware is processed through other coding modes.

Accordingly, as the network services become sophisticated while the malwares are flooding, there remains a need for solutions to safeguard private information against threats such as improper transmission by the malwares.

SUMMARY

An objective of certain embodiments of the present invention is to provide a monitor apparatus for monitoring data of hardware. The data has private information, identification information and at least one first network transmission address. The monitor apparatus comprises a storage unit and a processing unit. The storage unit is configured to store a mark information table and to store the data according to the identification information. The processing unit is configured to store the identification information of the data and the at least one first network transmission address in the mark information table. The processing unit accesses the data according to the identification information in response to an accessing system call and arranges a transmission of the private information of the data in response to a sending system call. The accessing system call is related to the identification information, and the sending system call has a second network transmission address. Finally, according to the identification information of the data and the at least one first network transmission address stored in the mark information table, the processing unit determines whether the at least one first network transmission address is identical to the second network transmission address. The processing unit will output a signal when the at least one first network transmission address is identical to the second network transmission address.

Another objective of certain embodiments of the present invention is to provide a monitor method for monitoring data of hardware. The data has private information, identification information and at least one first network transmission address. The data is stored in a storage unit according to the identification information. The monitor method comprises the steps of: enabling a processing unit to store the identification information of the data and the at least one first network transmission address in the mark information table, wherein the mark information table is stored in the storage unit; in response to an accessing system call, enabling the processing unit to access the data according to the identification information, wherein the accessing system call is related to the identification information; in response to a sending system call, enabling the processing unit to arrange a transmission of the private information of the data, wherein the sending system call has a second network transmission address; according to the identification information of the data and the at least one first network transmission address stored in the mark information table, enabling the processing unit to determine whether the at least one first network transmission address is identical to the second network transmission address; and enabling the processing unit to output a signal when the at least one first network transmission address is not identical to the second network transmission address.

Furthermore, to accomplish the aforesaid objectives, certain embodiments of the present invention further provide a computer program storage product comprising a tangible machine-readable medium which has executable codes to perform the aforesaid monitor method for monitoring data of hardware. When the executable codes are loaded into a monitor apparatus via a computer and executed, the aforesaid monitor method can be accomplished.

The monitor method and the monitor apparatus disclosed in certain embodiments of the present invention stores identification information of data and the network transmission address in a mark information table, wherein the data has private information and the network transmission address is where the data should be transmitted to. In addition, when the data having the private information is arranged to be transmitted, according to the system call and the identification information stored in the mark information table, the present invention will compare the network transmission address stored in the mark information table with the network transmission address of the arranged transmission. In this way, the present invention is able to avoid threats such as private information being improperly transmitted by a malware.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

Figure 1A:
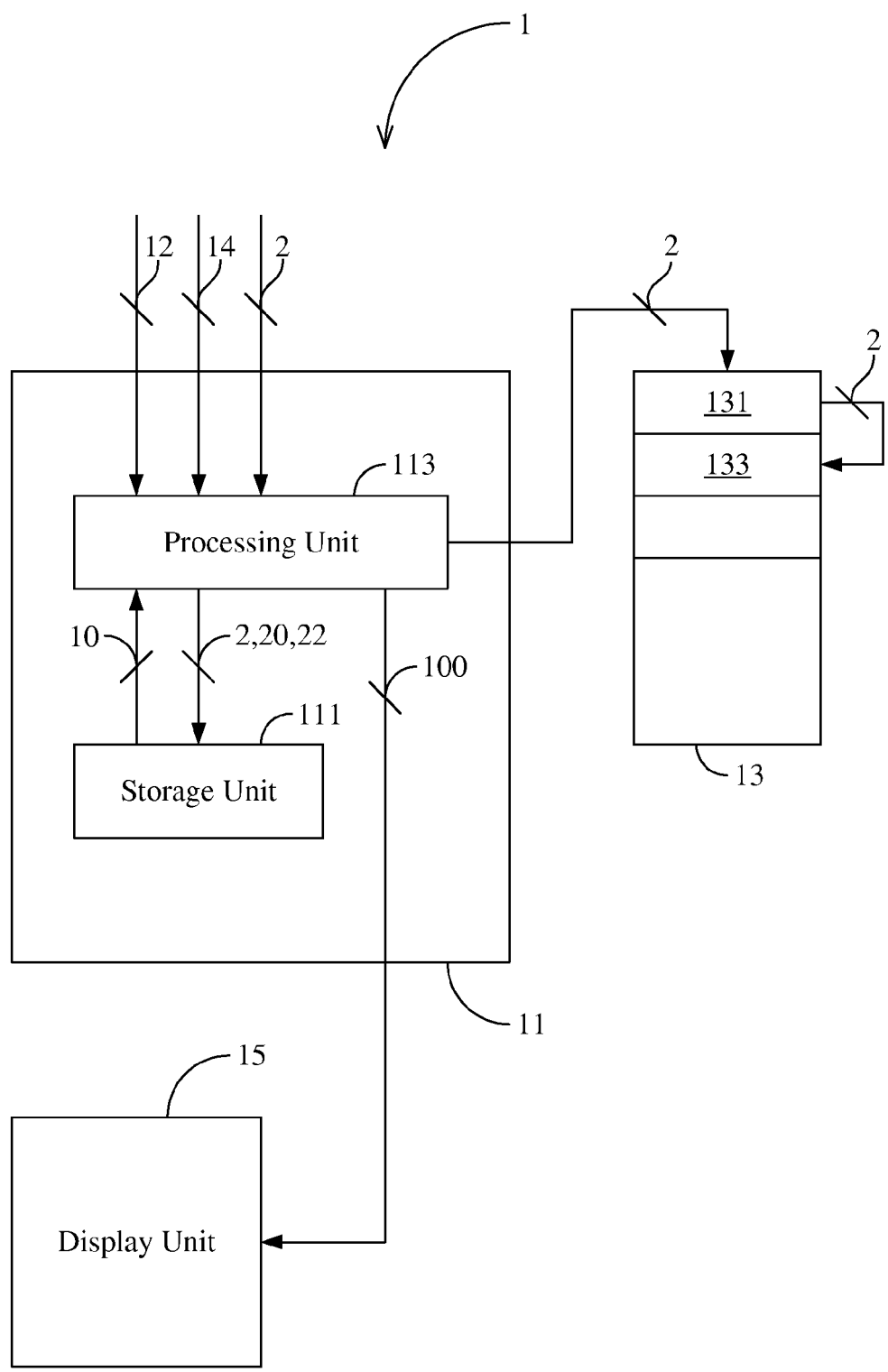
FIG. 1A is a schematic view of a monitor apparatus according to a first embodiment of the present invention.
Figure 1B:
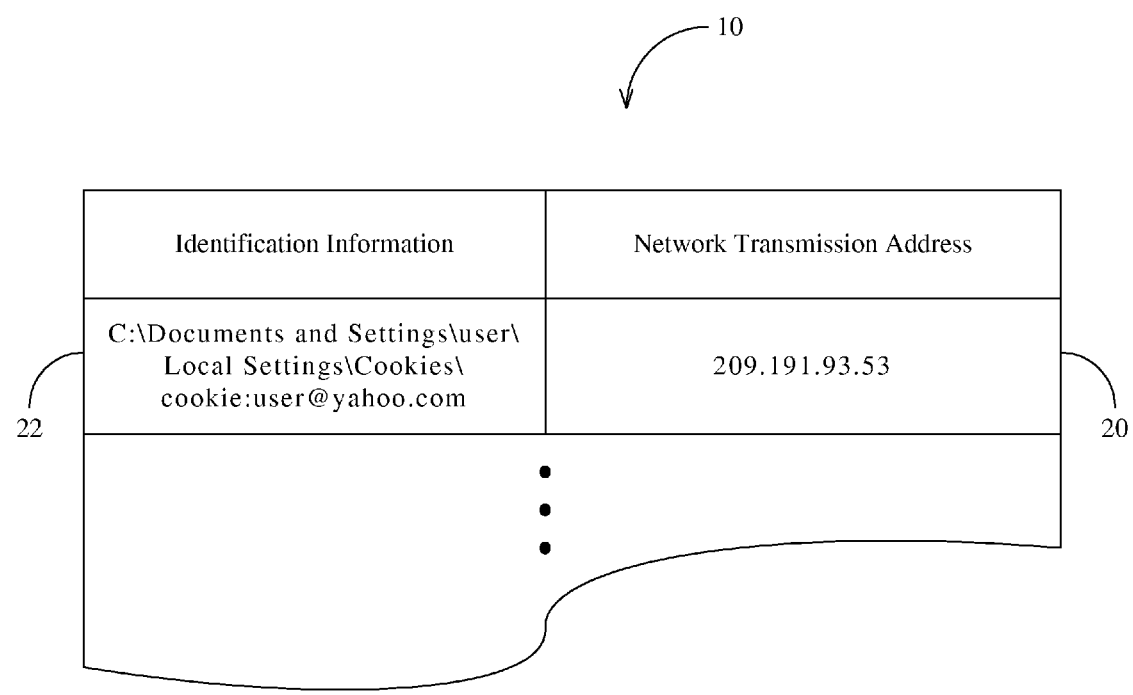
FIG. 1B is a schematic view of a mark information table according to the first embodiment of the present invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the spirit and scope of the invention as defined by the appended claims.

DETAILED DESCRIPTION

In the following description, the certain embodiments of the present invention will be explained with reference to example embodiments thereof. The present invention relates to a monitor apparatus and a monitor method for monitoring data of hardware. The present invention can advantageously avoid data having private information being transmitted to a network transmission address assigned by a malware. It should be appreciated that, in the following embodiments and the attached drawings, elements unrelated to the present invention are omitted from depiction; and dimensional relationships among individual elements in the attached drawings are illustrated only for ease of understanding, but not to limit the actual scale.

As shown in FIG. 1A, a first example embodiment of the present invention is a monitor apparatus 11 for monitoring data of hardware 1. The hardware 1 comprises a memory 13 and a display unit 15. A user can control individual components of the hardware 1 through an operation system (not shown). The operation system may be one of various commercially available operation systems in the market, such as Windows operation systems, Macintosh operation systems, Linux operation systems or Unix operation systems. In the present example, the operation system is a Windows operation system. The hardware 1 may be a personal computer (PC) or a Macintosh (MAC) from the Apple Computer Co., Ltd, and the hardware 1 is a PC in the first embodiment. It should be appreciated that the present invention has no attempts to limit the kinds of operation system 15 and the hardware 11. Those of ordinary skilled in the art may practice the present invention with other kinds of operation systems, hardware and combinations thereof, thus this will not be further described herein.

The monitor apparatus 11 comprises a storage unit 111 and a processing unit 113. The monitor apparatus 11 is electrically connected to the memory 13 and the display unit 15. The storage unit 111 is configured to store a mark information table 10. When a user is preparing to transmit data 2 having private information to a first network transmission address 20 through a browser (not shown) and the hardware 1, the processing unit 113 will store the data 2 in the storage unit 111 and/or the memory 13 according to a storage path and a data name, wherein the storage path and the data name are identification information 22 of the data 2. Meanwhile, the processing unit 113 stores the identification information 22 of the data 2 and the first network transmission address 20 in the mark information table 10.

As an example, when the user is preparing to transmit the data 2 having private information of an account/password to the first network transmission address 20 (e.g., 209.191.93.53) of a network service provider (e.g., Yahoo) server through the browser and the hardware 1, the processing unit 113 will store the data 2 in the storage unit 111 and/or the memory 13 according to the storage path (e.g., C:\Documents and Settings\user\Local Settings\Cookies\cookie: user@yahoo.com) and the data name (e.g., cookie: user@yahoo.com). Meanwhile, the processing unit 113 stores the storage path "C:\Documents and Settings\user\Local Settings\Cookies\cookie: user@yahoo.com" and the data name "cookie: user@yahoo.com" and the first network transmission address "209.191.93.53" in the mark information table 10.

It should be noted that the present invention has no limitation on the number of the first network transmission addresses 20 stored in the mark information table 10. In other words, the user may transmit the data 2 having the same identification information 22 to a plurality of first network transmission addresses 20 through the browser and the hardware 1. Those of ordinary skilled in the art may further store other first network transmission addresses 20 referring the above description, and the details will not be further described herein.

The private information is confidential information of a user, e.g., account/password information, cookie information and browser auto complete data information. The present invention has no limitation on the types of the private information. Those of ordinary skilled in the art may set the types and amount of the private information by themselves, this will not be further described herein.

When the processing unit 113 accesses the data 2 according to the identification information 22 in response to an accessing system call 12, the processing unit 113 will execute a series of procedures. It should be noted that the accessing system call 12 is related to the identification information 22. For example, the accessing system call 12 may be a data opening system call, a data reading system call, a data copying system call, a data moving system call, a data closing system call or a memory clearing system call.

In this example embodiment, in response to the data opening system call, the processing unit 113 will open the data 2 according to the identification information 22, wherein the data opening system call has a pass parameter and the pass parameter corresponds to the identification information 22. More specifically, the processing unit 113 determines that the data 2 is opened according to the following program codes:

```
HANDLE WINAPI OpenFile(
  _in LPCSTR cookie:user@yahoo.com,
  _out LPOFSTRUCT
IpReOpenBuff,
  _in UNIT uStyle);
``` wherein "OpenFile" represents the aforesaid data opening system call, "cookie:user@yahoo.com" represents the data name of the data 2, "HANDLE" is the pass parameter corresponding to the identification information 22. In more details, the pass parameter "HANDLE" will return a memory address (system ID), e.g. 0x0532233b. In other words, if there are other system calls having the pass parameter "HANDLE" relate to the identification information 22 (i.e. the same value "0x0532233b"), it indicates that those system calls are all for accessing the data 2. Once the processing unit 113 determines that the data 2 is opened according to the identification information 22 of the mark information table 10, it will begin to monitor and record all the related system calls.

Next, in response to the data reading system call, the processing unit 113 stores the privation information of the data 2 to a first memory address 131, wherein the data reading system call has aforesaid pass parameter, and the pass parameter corresponds to the first memory address 131. Further speaking, the processing unit 113 determines that the data 2 is read according to the following program codes:

```
BOOL WINAPI ReadFileEx(
_in HANDLE 0x0532233b,
_out_opt LPVOID IpBuffer,
_in DWORD
nNumberOfBytesToRead,
_inout LPOVERLAPPED
IpOverlapped,);
``` wherein "ReadFileEx" represents the data reading system call. The processing unit 113 determines that the data 2 is read since the pass parameter "HANDLE" is also related to the identification information 22 (i.e. the same value "0x0532233b"). Additionally, the parameter "IpBuffer" represents the first memory address 131 (e.g. 0x04e463b9) of the memory 13, wherein the data 2 is stored to the first memory address 131. Meanwhile, the processing unit 113 records the memory address where the private information of the data 2 is stored to (i.e. the first memory address 131) in the storage unit 111.

In this embodiment, in response to the data copying system call and/or the data moving system call, the processing unit 113 further copies and/or moves the private information of the data 2 from the first memory address 131 of the memory 13 to a second memory address 133. After the private information of the data 2 being copied and/or moved, the processing unit 113 records and/or updates the memory address where the private information of the data 2 currently being stored to the storage unit 111. The data copying system call and the data moving system call will be described respectively as follows.

In more details, according to the following program codes, the processing unit 113 determines that the private information of the data 2 is copied from the first memory address 131 to the second memory address 133:

```
void *memcpy(
    void *dest,
    const void *src,);
``` wherein "memcpy" represents the data copying system call, the parameter "*dest" represents the second memory address 133 (e.g. 0x00123456), and the parameter "*src" represents the first memory address 131 (i.e. 0x04e463b9). On the other hand, according to the following program codes, the processing unit 113 determines that the data is moved from the first memory address 131 to the second memory address 133:

mov eax[ebx];

"mov" represents the data moving system call, the parameter "eax" represents the second memory address 133 (e.g. 0x00123456), and the parameter "ebx" represents the first memory address 131 (i.e. 0x04e463b9).

It should be noted that if the processing unit 113 closes or clears the data 2 in response to the data closing system call or the memory clearing system call, the processing unit 113 will continue to monitor if there is any data having private information being accessed according to the mark information table 10. In other embodiment, the processing unit 113 determines that the data 2 is closed or cleared according the following program codes:

```
int FileClose(
Handle 0x0532233b
);
free(
*ptr
);
xor [eax][eax]
[eax]=[eax] [eax]
``` wherein "FileClose" and "free" represent the data closing system call and memory clearing system call respectively. The processing unit 113 determines that the data 2 is closed since the pass parameter "Handle" relates to the identification information 22 (i.e. the same value "0x0532233b"). In addition, parameter "*ptr" represents the memory address corresponding to the data to be closed, and the parameter "eax" represents the memory address corresponding to the data to be cleared. The processing unit 113 will compare the parameter "*ptr" or "eax" with the memory address corresponding to the private information of the data 2 currently stored (i.e. the second memory address 133) to see if they are identical, if they are identical, it implies that the data 2 is closed or cleared.

Accordingly, the disclosed invention is different from the conventional detecting malware by comparing database, the monitor apparatus 11 of the present invention determines if there is any system call for accessing the private information of the data 2 according to the pass parameter of each system call. Meanwhile, the monitor apparatus 11 records and/or updates the memory address corresponding to the private information of the data 2 being stored according to the memory address corresponding to the pass parameter, so that the monitor apparatus 11 can proceed the following surveillances.

Subsequently, in response to a sending system call 14, the processing unit 113 arranges a transmission of the private information of the data 2. More specifically, the sending system call 14 has a transmission data memory address and a second network transmission address (not shown). In this example embodiment, the second network transmission address is a network transmission address (e.g. 129.342.33.22) set by a malware. Further speaking, the processing unit 113 will arrange the transmission of the private information of the data 2 to the second network transmission address according to the following program codes:

```
int connect(
_in SOCKET s,
_ in const struct
```

```
        sockaddr *name,
        _in int namelen);
    int send(
        _in SOCKET s,
        _ in const char
    *buf,
        _in int len,
        _in int flags);
``` wherein "connect" represents a system call for establishing a remote connection, "send" represents a system call for transmitting the privation information of the data 2 via the established connection, the parameter "*name" represents the second network transmission address (i.e. 129.342.33.22), and the parameter "*buf" represents the transmission data memory address. The processing unit 113 retrieves the transmission data memory address (i.e. the value of the parameter "*buf") and determines whether the transmission data memory address is identical to the memory address corresponding to the private information of the data 2 being currently stored (i.e. the first memory address 131 and/or the second memory address 133).

If the processing unit 113 determines that the transmission data memory address (i.e. the value of the parameter "*buf") is identical to the first memory address 131 (i.e. 0x04e463b9) and/or the second memory address 133 (i.e. 0x00123456), it implies that the private information of the data 2 will be transmitted to the network transmission address assigned by the malware. Then, the processing unit 113 determines whether the second network transmission address is identical to the first network transmission address 20 according to the identification information 22 of the data 2 and the first network transmission address 20 stored in the mark information table 10. In this example embodiment, the second network transmission address (i.e. 129.342.33.22) is not identical to the first network transmission address 20 (i.e. 209.191.93.53), it implies the private information of the data 2 will be transmitted to the network transmission address assigned by the malware. Accordingly, the processing unit 113 will output a signal 100 to the display unit 15.

Then, the display unit 15 displays an alarming message according to the signal 100, meanwhile, the processing unit 113 ceases the transmission of the private information of the data 2 according to the signal 100. In contrast, if the second network transmission address is identical to the first network transmission address 20, the processing unit 113 will transmit the private information of the data 2 to the second network transmission address.

In other example embodiments, if the processing unit 113 determines that the transmission data memory address (i.e. the value of the parameter "*buf") is not identical to the first memory address 131 and/or the second memory address 133, it implies that the data to be transmitted is not having privation information, the processing unit 113 will process the transmission of the data, and the processing unit 113 of the monitor apparatus 11 will not execute the step of comparing the network transmission addresses.

Next, the processing unit 113 continues to monitor if the system call is continuously executing the transmission of the private information of the data 2. Meanwhile, the processing unit 113 keeps to monitor if there is other data having private information being accessed according to the mark information table 10.

Figure 2:
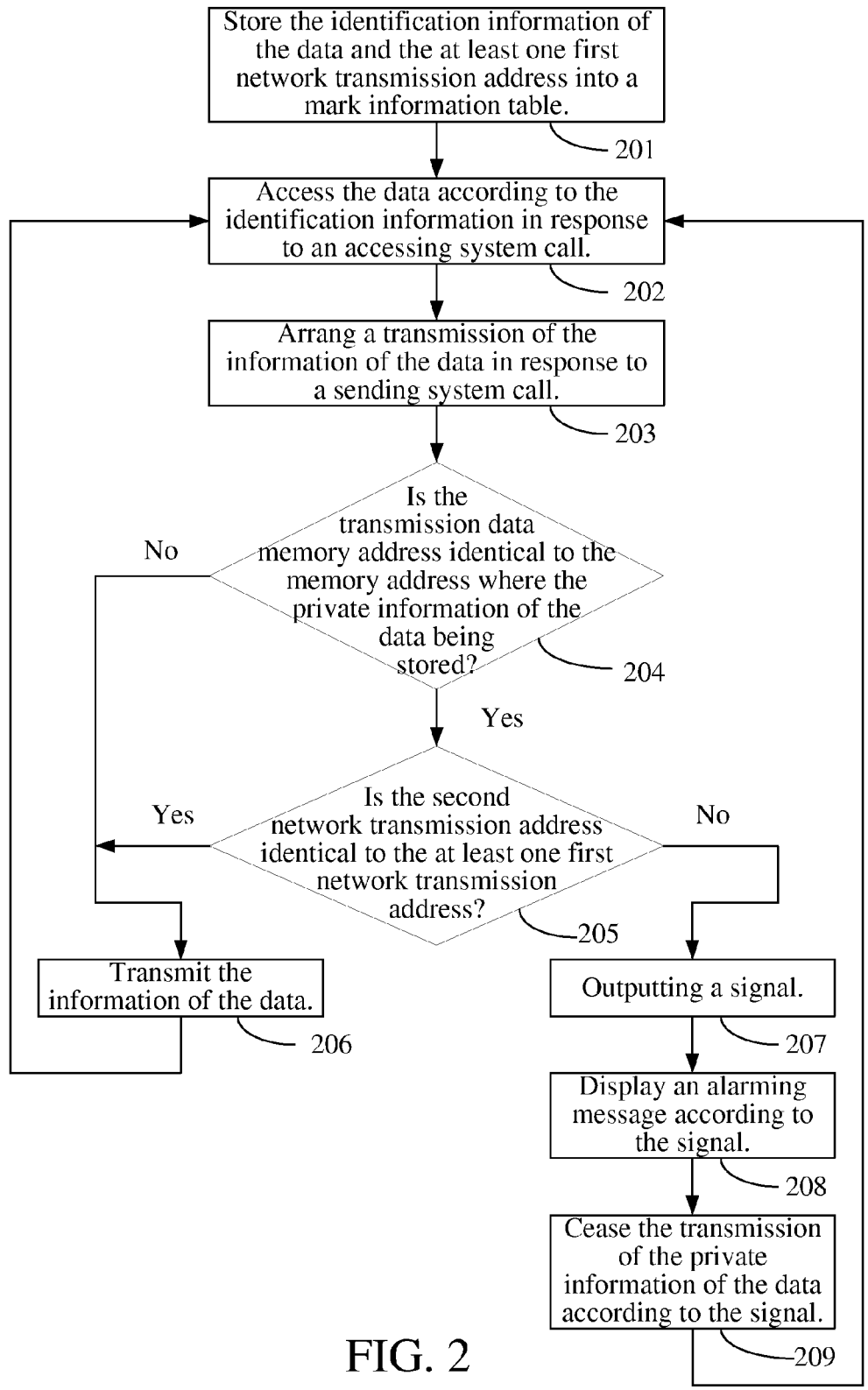
FIG. 2 is a flowchart of a monitor method according to a second embodiment of the present invention.

FIG. 2 shows a second example embodiment of the present invention, which is a monitor method for monitoring data of hardware. The monitor method may be used in a monitor apparatus, e.g., the monitor apparatus 11 described in the first embodiment. The monitor apparatus comprises a storage unit and a processing unit. The data has private information, identification information and at least one first network transmission address. The data is stored in the storage unit according to the identification information. The private information may be one of account/password information, cookie information and browser auto complete data information.

In particular, the monitor method of the second example embodiment may be implemented by a computer program storage product comprising a tangible machine-readable medium. When a plurality of executable codes stored in the tangible machine-readable medium are loaded into the monitor apparatus via a computer, the executable codes are executed to accomplish the monitor method. These executable codes may be stored in the tangible machine-readable medium, such as a read only memory (ROM), a flash memory, a floppy disk, a hard disk, a compact disk, a mobile disk, a magnetic tape, a database accessible to networks, or any other storage media with the same function and well known to those skilled in the art.

The monitor method of the second example embodiment comprises the following steps. Firstly, step 201 is executed to enable the processing unit to store the identification information of the data and the at least one first network transmission address in a mark information table, wherein the mark information table is stored in the storage unit. The identification information comprises a storage path and a data name, and the data is stored in the storage unit according to the storage path and the data name.

Next, in step 202, in response to an accessing system call, the processing unit accesses the data according to the identification information, wherein the accessing system call is related to the identification information.

For example, in response to a data opening system call, the processing unit opens the data according to the identification information in step 202, wherein the data opening system call has a pass parameter, and the pass parameter corresponds to the identification information. Subsequently, in response to a data reading system call, the processing unit further stores the private information of the data to a first memory address, wherein the data reading system call has the aforesaid pass parameter, and the pass parameter corresponds to the first memory address.

In one example embodiment, in response to a data copying system call, the processing unit copies the private information of the data from the first memory address to a second memory address. Alternatively, in another example embodiment, in response to a data moving system call, the processing unit moves the private information of the data from the first memory address to the second memory address. Finally, the processing unit records/updates the memory address corresponding to the private information of the data being stored (i.e. the first memory address and/or the second memory address) in the storage unit. Details about step 202 have already been described in the first embodiment, and thus will not be further described herein.

In step 203, in response to a sending system call, the processing unit arranges a transmission of the private information of the data, wherein the sending system call has a transmission data memory address and a second network transmission address. Next, in step 204, the processing unit retrieves the transmission data memory address of the sending system call and determines whether the transmission data memory address is identical to the memory address corresponding to the private information of the data being stored (i.e. the first memory address and/or the second memory address). If they are identical, the processing unit determines that whether the at least one first network transmission address is identical to the second network transmission address according to the identification information of the data and the at least one first network transmission address recorded in the mark information table in step 205.

If the processing unit determines that the second network transmission address is identical to the at least one network transmission address in step 205, then the private information of the data is transmitted to the second network transmission address in step 206, and the monitor method returns to step 202 to wait for other accessing system calls to access other data. If the processing unit determines that the second network transmission address is not identical to the second network transmission address in step 205, then step 207 is executed to enable the processing unit to output a signal. Then, in step 208, a display unit displays an alarming message according to this signal. Finally, step 209 is executed to enable the processing unit to cease the transmission of the private information of the data according to the signal, and then the monitor method returns to step 202 to wait for other accessing system calls to accessing other data.

If the processing unit determines that the transmission data memory address is not identical to the first memory address and/or the second memory address, it indicates that information of the data to be transmitted is not the private information. The monitor method next executes step 206 to transmit the information of the data to the second network transmission address and then returns to step 202 to wait for other accessing system call to access other data.

In addition to the aforesaid steps, the monitor method can also execute all the operations and functions set forth in the first example embodiment. How the monitor method executes these operations and functions will be readily appreciated by those of ordinary skilled in the art based on the explanation of the first embodiment, and thus will not be further described herein.

The monitor method and the monitor apparatus disclosed herein can store identification information of data and a network transmission address in a mark information table, wherein the network transmission address is where the data should be transmitted to. Then, certain embodiments of the present invention monitor the data having the private information according to system calls, if a sending system call is to transmit the data having the private information to a network transmission address, but the network transmission address can not corresponding to any network transmission addresses stored in the mark information table, the transmission of the privation information of data will be ceased. Accordingly, the present invention can address threats, including the improper transmission of private information by a malware.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A monitor method used in a monitor apparatus for monitoring data of hardware, the monitor apparatus comprising a processing unit and a storage unit, the data having private information, identification information and at least one first network transmission address of a network service provider server, the data being stored in the storage unit according to the identification information, the monitor method comprising the following steps of:

enabling the processing unit to store the identification information of the data and the at least one first network transmission address in a mark information table, wherein the mark information table is stored in the storage unit;

enabling the processing unit to access the data according to the identification information in response to an accessing system call generated by an operating system of the hardware, wherein the accessing system call is related to the identification information and comprises a data opening system call and a data reading system call;

enabling the processing unit to open the data according to the identification information in response to the data opening system call with a pass parameter, wherein the pass parameter corresponds to the identification information;

enabling the processing unit to store the private information of the data to a first memory address in response to the data reading system call with the pass parameter, wherein the pass parameter corresponds to the first memory address;

enabling the processing unit to arrange a transmission of the private information of the data in response to a sending system call, wherein the sending system call has a second network transmission address;

enabling the processing unit to determine whether the at least one first network transmission address is identical to the second network transmission address according to the identification information of the data and the at least one first network transmission address stored in the mark information table; and enabling the processing unit to output a signal when the at least one first network transmission address is not identical to the second network transmission address.

2. The monitor method of claim 1, wherein the identification information comprises a storage path and a data name, and the data is stored in the storage unit according to the storage path and the data name.

3. The monitor method of claim 1, wherein the sending system call has a transmission data memory address, the step of arranging the transmission of the private information of the data further comprises the following steps of:

enabling the processing unit to retrieve the transmission data memory address of the sending system call; and enabling the processing unit to determine whether the transmission data memory address is identical to the first memory address;

wherein the processing unit arranges the transmission of the private information of the data when the transmission data memory address is identical to the first memory address.

4. The monitor method of claim 1, wherein the step of accessing the data further comprises the following step of:

enabling the processing unit to copy the private information of the data from the first memory address to a second memory address in response to a data copying system call.

5. The monitor method of claim 1, wherein the step of accessing the data further comprises the following step of:

enabling the processing unit to move the private information of the data from the first memory address to a second memory address in response to a data moving system call.

6. The monitor method of claim 1, wherein the hardware has a display unit, and the monitor method further comprises the following step of:
   enabling the display unit to display an alarming message according to the signal.

7. The monitor method of claim 1, further comprising the following step of:
   enabling the processing unit to cease the transmission of the private information of the data according to the signal.

8. The monitor method of claim 1, wherein the private information is one of account/password information, cookie information and browser auto complete data information.

9. A monitor apparatus for monitoring data of hardware, the data having private information, identification information and at least one first network transmission address of a network service provider server, the monitor apparatus comprising:
   a storage unit, being configured to store a mark information table and to store the data according to the identification information; and
   a processing unit, being configured to store the identification information of the data and the at least one first network transmission address in the mark information table, to access the data according to the identification information in response to an accessing system call generated by an operating system of the hardware, and to arrange a transmission of the private information of the data in response to a sending system call, wherein the accessing system call is related to the identification information and comprises a data opening system call and a data reading system call, the data opening system call has a pass parameter corresponding to the identification information, the data reading system call has the pass parameter corresponding to a first memory address, the processing unit is further configured to open the data according to the identification information in response to the data opening system call, and to store the private information of the data to the first memory address in response to the data reading system call;
   wherein the sending system call has a second network transmission address;
   wherein the processing unit is further configured to determine whether the at least one first network transmission address is identical to the second network transmission address according to the identification information of the data and the at least one first network transmission address stored in the mark information table, and when the at least one first network transmission address is not identical to the second network transmission address, the processing unit outputs a signal.

10. The monitor apparatus of claim 9, wherein the identification information comprises a storage path and a data name, and the processing unit stores the data in the storage unit according to the storage path and the data name.

11. The monitor apparatus of claim 9, wherein the sending system call has a transmission data memory address, the processing unit retrieves the transmission data memory address of the sending system call and determines whether the transmission data memory address is identical to the first memory address, wherein the processing unit arranges the transmission of the private information of the data when the transmission data memory address is identical to the first memory address.

12. The monitor apparatus of claim 9, wherein the accessing system call further comprises a data copying system call, and the processing unit is further configured to copy the private information of the data from the first memory address to a second memory address in response to the data copying system call.

13. The monitor apparatus of claim 9, wherein the accessing system call further comprises a data moving system call, and the processing unit is further configured to move the private information of the data from the first memory address to a second memory address in response to the data moving system call.

14. The monitor apparatus of claim 9, wherein the hardware has a display unit being configured to display an alarming message according to the signal.

15. The monitor apparatus of claim 9, wherein the processing unit is further configured to cease the transmission of the private information of the data according to the signal.

16. The monitor apparatus of claim 9, wherein the private information is one of account/password information, cookie information and browser auto complete data information.

* * * * *